United States Patent [19]
Olson

[11] 3,723,022
[45] Mar. 27, 1973

[54] BEARING SUPPORTED COUPLING FOR TURBOCHARGERS

[75] Inventor: George E. Olson, Lacon, Ill.
[73] Assignee: Caterpillar Tractor Co., Peoria, Ill.
[22] Filed: Mar. 1, 1971
[21] Appl. No.: 122,597

[52] U.S. Cl. ............... 415/175, 417/407, 184/6.28
[51] Int. Cl. ....... F01d 5/08, F04b 17/00, F01m 11/00
[58] Field of Search ...... 417/407; 184/6.28; 415/111, 415/112, 175, 176, 177, 180

[56] References Cited

UNITED STATES PATENTS

| | | | |
|---|---|---|---|
| 2,109,997 | 3/1938 | Hoffmann | 416/95 |
| 2,442,202 | 5/1948 | Hughes et al. | 184/6.26 |
| 2,480,095 | 8/1949 | Buchi | 415/180 |
| 3,179,328 | 4/1965 | Pouit | 415/112 |

FOREIGN PATENTS OR APPLICATIONS

| | | | |
|---|---|---|---|
| 829,853 | 4/1938 | France | 415/175 |
| 966,394 | 8/1957 | Germany | 417/407 |

*Primary Examiner*—Henry F. Raduazo
*Attorney*—Fryer, Tjensvold, Feix, Phillips & Lempio

[57] ABSTRACT

A bearing supported coupling arrangement between a turbine wheel and compressor wheel arranged in axially aligned housings of a turbocharger with the two wheels and housings forming an axial chamber, the coupling including a support shaft secured at one end to one of the housings and supported at its other end by the other housing, a tubular shaft interconnecting the wheels and arranged for rotation upon the support shaft by means of a pair of anti-friction bearings, the tubular shaft isolating the axial chamber from the interior of the two housings with means for providing lubricant flow through the axial chamber to lubricate and cool the bearings.

4 Claims, 1 Drawing Figure

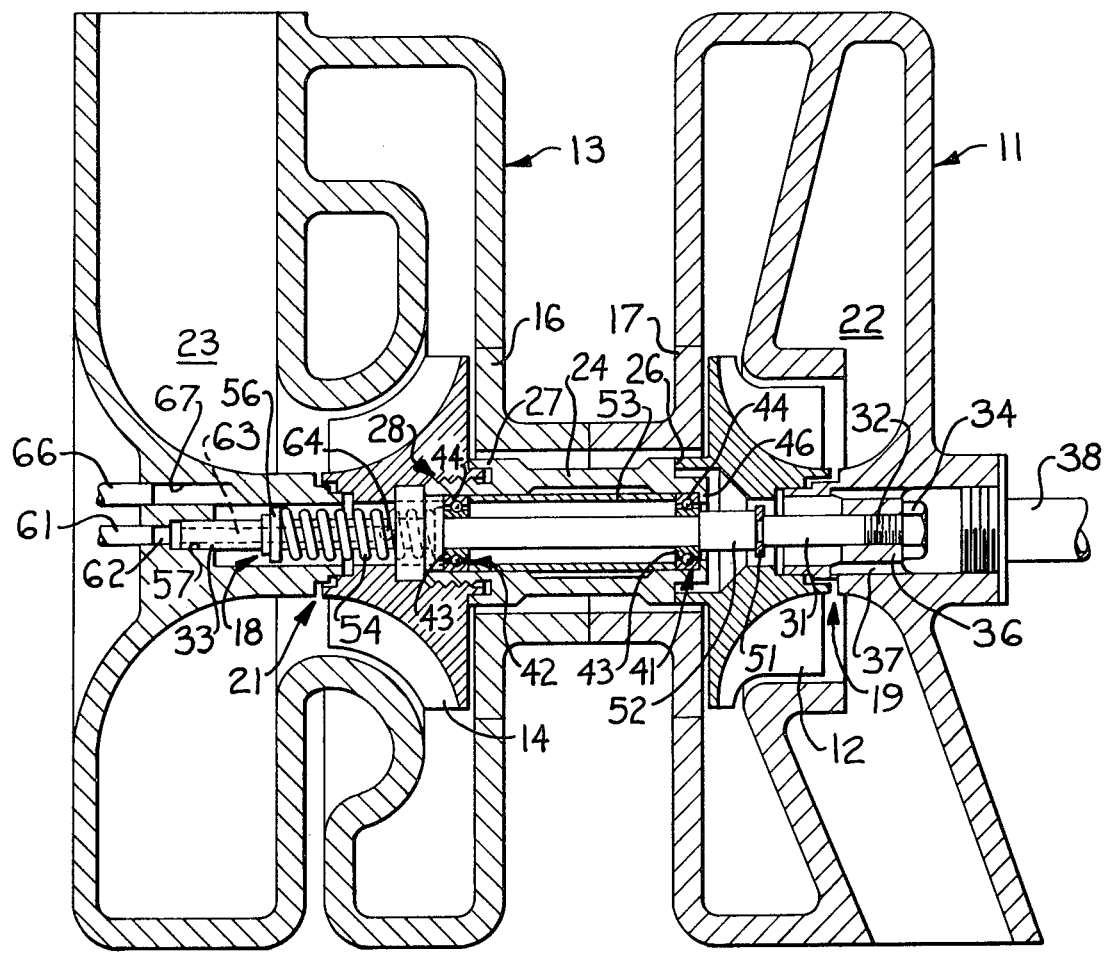
INVENTOR
GEORGE E. OLSON

BEARING SUPPORTED COUPLING FOR TURBOCHARGERS The present invention relates to a bearing supported coupling for turbochargers and more particularly to such an arrangement wherein a stationary shaft is supported at its opposite ends by the turbine and compressor housings of the turbocharger, a tubular shaft interconnecting the turbine wheel and compressor wheel while being supported by anti-friction bearings upon the stationary shaft to provide an enclosed axial chamber for facilitating lubrication of the bearings.

Because of the high speeds common in turbocharger operation, the provision of bearings for supporting a coupling between the turbine wheel and compressor wheel raise numerous problems which tend to limit design freedom within the turbochargers. Journal type bearings have often been used to support such turbocharger couplings. However, such bearings generally require a constant source of lubrication and are often damaged, for example, when the engine accelerates during start-up.

Anti-friction bearings are a desirable alternative for such applications since they will operate with considerably less lubrication as compared to a journal bearing for example. Conventionally antifriction bearings have been mounted inboard of the turbocharger wheels with the outer bearing races mounted in a central housing and the inner races supporting a shaft which provides a coupling for the turbocharger. In such arrangements, the bearings tend to become so large in diameter that surface speeds are a critical problem. Even when anti-friction bearings are employed in such a coupling, it is particularly desirable to insure an adequate supply of lubricant especially during start-up to prevent damage to the bearings from operation even for limited periods of time under dry conditions.

Accordingly, it is an object of the present invention to provide a relatively simple bearing supported coupling for turbochargers while insuring reliability of operation and maintaining a supply of lubricant to the bearings.

It is an additional object of the invention to provide such a coupling arrangement wherein a tubular shaft provides the coupling and isolates an axial chamber from the turbine and compressor housings with the tubular shaft being supported by anti-friction bearings upon a stationary shaft extending between the two housings.

It is a further object within such a coupling arrangement to provide means for maintaining accurate axial alignment of the stationary support shaft, the bearings and the tubular coupling shaft.

It is another object to provide within such a coupling arrangement means for assuring a constant supply of lubricant to the bearings even during start-up conditions.

Other objects and advantages of the present invention are made apparent below having reference to the accompanying drawing.

The drawing is a centrally sectioned view of a turbocharger assembly including turbine and compressor wheels arranged in respective housings with a bearing support arrangement providing a coupling between the wheels.

A preferred embodiment of the present invention is described below having reference to a turbocharger assembly as illustrated in the drawing. Referring now to the drawing, the turbocharger assembly includes a turbine housing 11 within which a turbine wheel 12 is arranged for rotation and a compressor housing 13 within which a compressor wheel 14 is arranged for rotation. The two housings are arranged in axially spaced apart relation by means of abutting collars 16 and 17 within which a portion of the present bearing supported coupling is contained.

The two housings and wheels together with the collars 16 and 17 provide an axial chamber 18 extending through a substantial portion of the turbocharger assembly. Labyrinth seal arrangements indicated at 19 and 21 between the outer axial ends of the two wheels and the respective housings prevent communication between the axial chamber 18 and the interior regions 22 and 23 of the housing 11 and 13.

The wheels 12 and 14 are coupled together for rotation by means of a tubular shaft 24. Preferably, the tubular shaft 24 is integrally secured at one end 26, for example, by welding, to one of the wheels such as the turbine wheel 12. The other end 27 preferably provides an adjustable and releasable coupling with the other wheel such as the compressor wheel 14, by means of a threaded coupling 28, for example. It is to be noted in particular that the tubular shaft 24 together with the wheels 12, 14 and the labyrinth seals 19, 21 completely isolate the axial chamber 18 from the interior regions 22 and 23 of the housings.

In order to support the tubular shaft 24 for rotation with the two wheels 12 and 14, a stationary shaft 31 is supported at its opposite ends 32 and 33 respectively by means of the two housings 11 and 13. Preferably, the one end 32 of the support shaft 31 is axially secured to the turbine housing by means of a lock nut 34 acting against a webbed portion 36 of the turbine housing. The webbed housing portion 36 provides passages such as that indicated at 37 for communicating the axial chamber 18 with a drain outlet 38 which is discussed in greater detail below.

The tubular shaft 24 is supported for rotation upon the stationary shaft 31 by means of two antifriction bearings indicated respectively at 41 and 42. Each of the bearings 41 and 42 has an inner race 43 which is press fitted onto the shaft 31. The outer races 44 provide radial support for the tubular shaft 24. The outer race 44 of the bearing 41 also acts against a collar 46 on the tubular shaft 24.

Axial alignment of the bearing arrangement is maintained in the following manner. A snap ring 51 fitting on to the shaft 31 positions a spacer 52 which acts against the inner race 43 of the bearing 41. A tubular spacer 53 of relatively large diameter is arranged for interaction between the outer races 44 of the two bearings while maintaining axial communication throughout the chamber 18. A resilient spring 54 interacts between the inner race 43 of the bearing 42 and a spring seat 56 which is also secured to the shaft 31.

At this point, it is noted that the other end 33 of the shaft 31 is relatively loosely journalled into a bore 57 formed by the compressor housing 13. The journalled support for the shaft end 33 together with the rigid connection at its other end 32 provides for positive radial alignment of the shaft 31 while permitting axial contraction or expansion depending upon operating conditions, particularly temperature. This support arrangement for the rod 31 together with the spacer arrangement described above for the bearings 41 and 42 serves to maintain radial alignment of the entire coupling arrangement while permitting limited axial movement due to temperature variations.

The coupling arrangement as described above permits lubrication of the bearings 41 and 42 in a particularly simple and effective manner. As illustrated in the drawing, lubricant is introduced through a conduit 61 and passage 62 adjacent to the journalled end 33 of the support shaft. An axially formed passage 63 in the rod 31 communicates the passage 62 with an intersecting outlet passage 64 also formed by the shaft 31 so that the lubricant is introduced into the axial chamber 18 adjacent one of the anti-friction bearings. Air is also introduced into the left end of the axial chamber 18, as viewed in the drawing, by means of a conduit 66 and a passage 67. As the air flows rightwardly through the axial chamber, it entrains the lubricant from the outlet passage 64 so that a lubricant mist flows across both of the bearings 41 and 42. After crossing the bearing 41, the lubricant mist passes through the passages 37 and out the drain conduit 38. Air under pressure for introduction into the axial chamber 18 through the conduit 66 may be taken for example from the intake manifold of the turbocharger by various means (not shown). The particular arrangement of the drain passage 38 is also susceptible to modification. For example, lubricant crossing the bearings might flow through the drain into the turbocharger discharge passage.

I claim

1. A bearing supported coupling arrangement between the turbine wheel and compressor wheel of a radial flow turbocharger comprising:
   a. a turbine housing in which the turbine wheel is supported,
   b. a compressor housing in which the compressor wheel is supported, said housings having opposed engaged portions,
   c. a rotatable tubular support shaft defining an axis of rotation connecting said turbine wheel to said compressor wheel,
   d. said wheels, said housings and said support shaft cooperating to form a lubrication chamber,
   e. a non-rotating shaft along said axis fixedly attached to one of said housings at a point longitudinally beyond the wheel associated with said one housing, and supported by the other of said housings at a point longitudinally beyond the wheel associated with said other housing,
   f. a pair of anti-friction bearings between said support shaft and said non-rotating shaft;
   g. bearing positioning means including first bearing positioning means on said non-rotating shaft adjacent one end of said support shaft, second bearing positioning means rotatably mounted between said bearings, and third resilient bearing positioning means adjacent the other end of said support shaft, said first, second and third bearing positioning means cooperating to position said bearings in a spaced apart relationship about said shaft and in said chamber,
   h. means arranged generally on one axial side of said bearings for introducing a mist of lubricant into the axial chamber for flow through the bearings and on the other side of said bearings for drainage of said lubricant from the chamber and bearings.

2. The turbocharger coupling of claim 1 wherein each of said bearings includes an inner race mounted on said non-rotating shaft and outer race supporting said support shaft, said first bearing positioning means abutting the inner race of one bearing, said second bearing positioning means arranged between the outer races of said bearings, and said third bearing positioning means abutting the inner race of the other bearing.

3. The turbocharger coupling of claim 1 wherein said support shaft is journalled into a bore formed in said other housing.

4. The turbocharger coupling of claim 1 wherein said lubricating means further includes an air inlet at the compressor end of said turbocharger, a lubrication inlet at the compressor side of said turbocharger, an axial passage formed in said chamber by a portion of said non-rotating shaft, and a webbed portion in said turbine housing through which the non-rotating shaft is secured, said air and lubricant inlet means providing said lubricant mist and cooperating with said passage to transmit said lubricant across said bearings, and further cooperating with said webbed portion to drain said lubricant from said turbine housing.

* * * * *